July 27, 1954
G. E. GRINDROD
2,684,906
CHEESE SLICE TREATMENT AND PRODUCT TO
PREVENT SLICE ADHESION AND MOLD
Filed Nov. 3, 1951
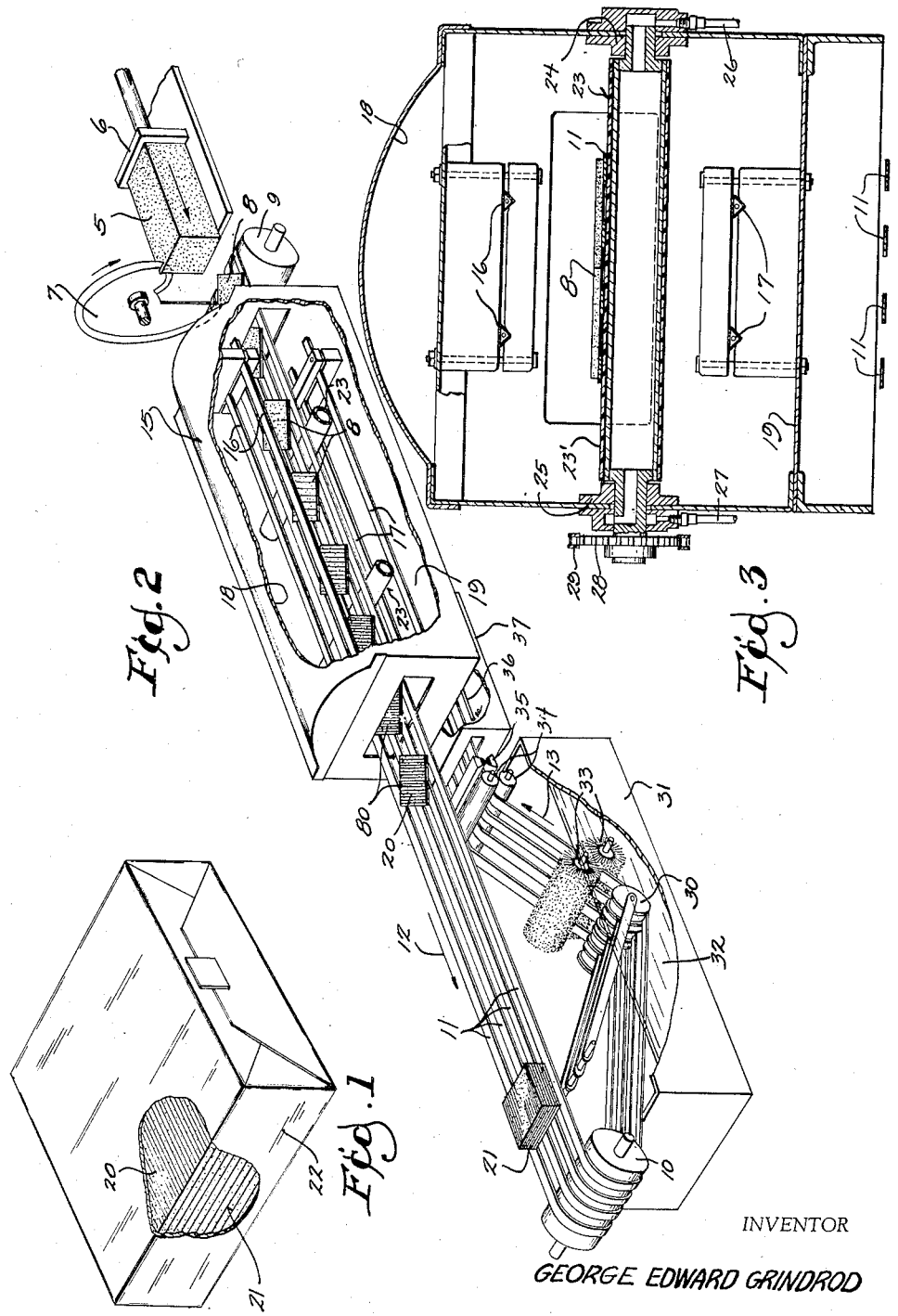
INVENTOR
GEORGE EDWARD GRINDROD
BY *Wheeler, Wheeler & Wheeler,*
ATTORNEYS Patented July 27, 1954

2,684,906

UNITED STATES PATENT OFFICE 2,684,906

CHEESE SLICE TREATMENT AND PRODUCT TO PREVENT SLICE ADHESION AND MOLD

George Edward Grindrod, Oconomowoc, Wis.

Application November 3, 1951, Serial No. 254,771

7 Claims. (Cl. 99—178)

This invention relates to a cheese slice treatment, apparatus and product to prevent slice adhesion and mold.

Some way of packaging cheese, and particularly natural cheese in pre-cut slices, has long been sought, since the sliced cheese is convenient to the consumer and the weight of cheese in the package can be accurately adjusted to produce units of uniform size. However, pre-sliced cheese, whether natural or processed cheese, tends to mold and the slices tend to adhere. Attempt to solve the problem by introducing separating membranes of paper or foil have made the slices non-adherent, but have increased the tendency to mold.

The present invention involves the treating of the freshly cut surfaces of cheese slices in such a way that the slices will be non-adherent and will remain free of mold during normal commercial handling. The invention is based on the peculiar structure of cheese which consists of a continuous phase of hydrated protein in which lie globules of butter fat as a discontinuous phase. By a drying operation, the phase may readily be reversed at the surface of the slices so that the fat will become the continuous phase. Where each slice has a superficial continuous film of oil, the slices will not adhere, nor will mold develop, for the mold penetrates and propagates in the hydrated protein which is normally the continuous phase at the surface of the slice. So far as is known, the process appears useful for treating cheese only.

In practice, it is found desirable to accomplish the drying of the freshly cut surfaces by infra red radiation of the slices in a heating tunnel through which the slices are carried by a conveyor which is not opaque to the radiation form below the slices. It has been found to be desirable, also, to support the conveyor ribbons on chilled rolls and to wash and dry the conveyor belt or belts continuously in the course of their movement so that neither cheese particles nor liquids exuding from the cheese will burn on the belts or rollers in the course of continued exposure to the heat.

Cross reference is made to my co-pending application Serial No. 140,413, filed January 25, 1950, for Apparatus and Method for Cheese Packaging and Treatment.

In the drawings:

Fig. 1 is a view in perspective showing a complete package of sliced cheese prepared in accordance with my invention, a portion of the wrapper being broken away to expose the cheese slices.

Fig. 2 is a view in perspective diagrammatically illustrating on a reduced scale apparatus for carrying out my process, portions of the apparatus being broken away.

Fig. 3 is a view taken on an enlarged scale in cross section through the device of Fig. 2.

In Fig. 2, I have shown at 5 a loaf of cheese being advanced by the ram 6 across the path of a conventional helically volute cutting knife 7 which severs from the loaf successive slices 8. These slices fall on to a conveyor which is advancing at such a rate that the slices are spaced individually thereon, without overlap. The conveyor desirably comprises rolls 9 and 10 over which operate a series of belts 11 advancing in the direction indicated by the arrow 12 in Fig. 2 and returning, beneath the treatment zone, in the direction indicated by arrow 13 in Fig. 2. Conveyor belts 11 are desirably spaced apart and made from a material which is not only reasonably transparent to infra red radiation but also readily cleaned. One or more rotary brushes 33 or the like operates continuously on the belts to remove cheese particles which might discolor and stick to successive cheese slices if subjected to heat repeatedly. Stainless steel and "Teflon" reinforced with glass fibers are the two most satisfactory conveyor belt materials presently known.

As soon as possible after the cheese slices 8 are severed from the loaf, they pass into the oven 15 which desirably comprises radiating resistors 16 and 17, respectively, above and below the run of the conveyor belts 11 upon which the cheese slices 8 are supported. Desirably, the oven has reflective surfaces at 18 and 19 for directing the heat developed in the resistors 16 and 17 upon the upper and lower surfaces of the successive slices of cheese.

After experimenting with many combinations of radiation and times of exposures, I have found that about 10 watts per square inch of infra red radiation for five to six seconds, will reverse the phase at the surface of the cheese slice to cause an oil film to cover the surface. Obviously, an increase in the amount of radiation will permit a reduction of time and exposure, and vice versa.

In practice, I have used a heating tunnel 15 about ten feet in length and fed the cheese slices through it at the rate of about 200 slices per minute, each being exposed about six seconds. The radiation figures given represent the energy input into the radiant heating elements.

It is not necessary to define the heat and time of exposure with accuracy because the spread of the film of oil over the surface of the cheese is readily visible and the heating can simply be continued until the film is observed to have covered the surface. The above figures are higher than the heat energy actually required to do the job, but I prefer to use heat and exposure of approximately these relative values in order to assure completion of the treatment by total displacement of the hydrated phase by the film of oil.

It is further desired to observe that the use of infra red radiation is merely one means of drying the surface, and any other means of drying the surface will accomplish the desired reversal of phase in accordance with the present invention. A current of hot air has successfully been employed experimentally, but radiant heat is preferred and is used in commercial practice.

It may be noted that the ordinary operation of slicing cheese accomplishes just the opposite of the results here attained, since cheese does not slice readily unless it is cold and the refrigerated cheese, falling in slices from the loaf, immediately tends to collect water on its surfaces, thereby increasing the stability of the hydrated protein phase instead of substituting a film of oil as is done in the practice of the present invention.

To the extent that the heat transparent conveyor belts 11 need support in traversing the oven 15, I have found it expedient to use rollers 23 chilled by circulating water therethrough by means of pipes 26 and 27 as in Fig. 3. In practice these rollers are made of stainless steel jacketed at 23' with Teflon.

After treatment, the slices 30, upon which the shading 20 represents the film of oil, may be accumulated in any desired manner, manually or mechanically, into stacks as shown at 21 and wrapped in an impervious membrane or wrapper 22 of web or foil; the resulting package as shown in Fig. 1 is then in readiness for the market and will remain stable over long periods of time with the slices readily separable and mold-free under any normal merchandising conditions.

While the term "cheese" frequently does not technically include "processed cheese," I am so using it in the present case, except as otherwise indicated in the appended claims.

In actual practice, I have found it desirable to chill the rolls 23 which support the conveyor ribbons 11 within the furnace. As best shown in Fig. 3, the rolls may be tubular and provided with bearings 24 and 25 having pipe connections 26 and 27 respectively, for the circulation of a coolant through each roll. Each roll is desirably power driven as indicated in Fig. 3 by the provision of sprocket 28 and driving chain 29.

It has further been found desirable to wash and dry the conveyor belt or belts continuously. For this purpose, the return runs of belts 11 are passed about belt tightening idlers 30 in a wash tank 31 which is partially filled with a washing liquid 32 in which the belts are immersed in passing about the idlers 30. Beyond the idlers are rotary brushes at 33 acting on the upper and lower surfaces of the belts. Beyond the brushes in the path of return indicated by arrow 13, the belts pass between wringer rolls 34 and rubber wipers 35, after which they are exposed to heat radiating from the heating elements 36 in a special drying chamber 37. By the time the wiped and heated belt surfaces return about the guide roll 9, they will be clean and dry and in readiness to receive freshly cut slices for treatment.

I claim:

1. A method of preparing for packaging a stack of non-adhering slices of cheese which normally constitutes an emulsion in which butter fat is in a discontinuous phase in a continuous phase of hydrated protein, said method comprising the steps of slicing the cheese and thereupon effecting superficial reversal of emulsion phase on the freshly cut surfaces of the slices by dehydrating such surfaces until an oil film develops thereon.

2. The method of claim 1 in which dehydration is effected by subjecting the freshly cut surfaces to a current of dehydrating gas.

3. The method of claim 1 in which superficial dehydration and phase reversal are effected by thermal radiation of the cut slice surfaces, followed by the further step of assembling the irradiated slices in a stack in which the oil films on the cut surfaces intervene between the normal cheese emulsions of the slices, the said oil films rendering the slices readily separable and substantially mold-free during commercial handling.

4. The method of claim 3 in which the cheese is cold when sliced and the slices are cold when irradiated, the step of irradiation being terminated before the cheese of the slice below the irradiated surface becomes warmed substantially above its starting temperature.

5. The method of claim 3 in which the radiation exposes the cheese surface to about ten watts per square inch for about five or six seconds.

6. As a new article of manufacture, a package comprising readily separable slices of cheese normally having an external continuous water phase and an internal discontinuous oil phase, the said slices having cut surfaces in contact, the said slices having only at their said cut surfaces their oil phase external to their water phase, whereby a continuous film of oil intervenes between the hydrated protein phase of successive cheese slices.

7. The article of claim 6 in which the cheese comprises a natural cheese.

References Cited in the file of this patent

UNITED STATES PATENTS

| Number | Name | Date |
|---|---|---|
| 1,838,000 | Rumsey, Jr. | Dec. 22, 1931 |
| 2,018,719 | Haug | Oct. 29, 1935 |
| 2,109,093 | Rossman et al. | Feb. 22, 1938 |
| 2,361,775 | Kraft | Oct. 31, 1944 |
| 2,525,348 | Glass | Oct. 10, 1950 |
| 2,540,815 | Eldredge | Feb. 6, 1951 |
| 2,606,122 | Stark | Aug. 5, 1952 |